United States Patent
Carr (10) Patent No.: US 7,012,915 B1
(45) Date of Patent: Mar. 14, 2006

(54) PERSONALIZED LCD DIRECTORY

(75) Inventor: Daniel J. Carr, Merrimac, NH (US)

(73) Assignee: 3Com Corporation, Marlborough, MA (US)

( * ) Notice: Subject to any disclaimer, the term of this patent is extended or adjusted under 35 U.S.C. 154(b) by 899 days.

(21) Appl. No.: 09/784,422

(22) Filed: Feb. 14, 2001

(51) Int. Cl.
*H04L 12/66* (2006.01)

(52) U.S. Cl. ...................... 370/352; 370/356

(58) Field of Classification Search .............. 370/352, 370/356
See application file for complete search history.

(56) References Cited

U.S. PATENT DOCUMENTS

| | | | | |
|---|---|---|---|---|
| 6,031,904 | A * | 2/2000 | An et al. .............. | 379/201.02 |
| 6,452,924 | B1 * | 9/2002 | Golden et al. ........... | 370/352 |
| 6,546,002 | B1 * | 4/2003 | Kim ...................... | 370/351 |
| 6,707,811 | B1 * | 3/2004 | Greenberg et al. ........ | 370/352 |
| 6,744,759 | B1 * | 6/2004 | Sidhu et al. ............. | 370/356 |
| 6,757,363 | B1 * | 6/2004 | Platt et al. .............. | 379/88.11 |
| 6,785,266 | B1 * | 8/2004 | Swartz ................... | 370/352 |
| 2001/0033564 | A1 * | 10/2001 | Hickman ................. | 370/352 |
| 2001/0038624 | A1 * | 11/2001 | Greenberg et al. ........ | 370/352 |
| 2002/0034177 | A1 * | 3/2002 | Herrmann et al. ........ | 370/352 |
| 2003/0053444 | A1 * | 3/2003 | Swartz ................... | 370/352 |
| 2003/0095541 | A1 * | 5/2003 | Chang et al. ............ | 370/352 |

* cited by examiner

*Primary Examiner*—John Pezzlo
*Assistant Examiner*—Hong Sol Cho
(74) *Attorney, Agent, or Firm*—McGlew & Tuttle PC (57) ABSTRACT

A network telephone system includes a distributed network with a connected network call processor with access to a memory or data storage to form a central database. A plurality of network telephones are connected to the network that have user specific records provided at the central database. The telephones have a display for displaying the information stored in the central database. The telephones have at least one key for assisting in access to the data displayed on the display or for selecting data, changing the display and/or actuating a telephone function based on the status of the display. A network device (personal computer) is connected to the network telephone system and includes a web browser software interface interfacing with the network call processor and central database for managing at least a portion of the central database to add or remove names, data, telephone numbers and otherwise change the contents of the database and access the data via the key of a network telephone or by using the web browser.

17 Claims, 6 Drawing Sheets

PERSONALIZED LCD DIRECTORY

FIELD OF THE INVENTION

The invention relates generally to telephone systems and more particularly to private branch exchange (PBX) systems and distributed telephone network systems such as networks with a component connected to the public telephone system and network connections to user network telephone units.

BACKGROUND OF THE INVENTION

Telephone systems are known which provide a common interface between a plurality of users and a public telephone network. These systems have been referred to as PBX systems. A typical PBX system includes a central box with line cards providing connections to assigned lines of a public telephone network. The central box is connected by wires such as twisted pair wires to individual telephone units. The connection from the central box to the telephone units may be by way of analogue or digital signals. More recently, digital signals are sent by the central unit to the phone units. The digital signals include voice data as well as control and messaging data. The units typically include a simple handset as well as a speaker for paging, intercom type communications and speaker phone applications. Typically the base unit also includes a microphone. The handset is a typical handset providing a speaker and a microphone.

Telephone systems using distributed networks, such as local area networks (LANs) are also generally known. With these systems, a distributed network is provided, such as CSMA/CD (see IEEE 802.3) generally known as Ethernet. A telephone network system is provided with a central box having line cards connected to the distributed network as well as network devices connected to the network. The network devices include network telephones with, for example, a base unit with a speaker and a microphone and a handset (with a speaker and a microphone). Data packets are sent over the network between network devices. A network control processor or network call processor (NCP) may be used to monitor and control the access to the public telephone network. Features specific to the user may be established with the NCP.

Digital PBX systems are known which include a display associated with the PBX telephone unit and which have keys allowing entry of data into the system via the PBX telephone unit. This allows for the storage of frequently called numbers (speed dial numbers) and other user specific information (name of the user associated with the PBX telephone unit etc.). Such systems are notoriously difficult to program and reconfigure for different users.

SUMMARY AND OBJECTS OF THE INVENTION

It is an object of the invention to provide a network telephone system which has a central database accessible by devices connected to a network including network telephones as well as other network devices (such as computers) and wherein data may be entered for individual users via a software graphical interface (e.g., a web browser based interface) on a network device and wherein the data can then be accessed on the user's network telephone.

According to the invention, a network telephone system is provided comprising a distributed network with a network call processor with access to a memory or data storage to form a central database. The call processor is connected to the network. A plurality of network telephones are connected to the network. The network telephones have user specific records provided at the central database. The telephones have a display for displaying the information stored in the central database including user specific records and optionally system information. The telephones have at least one key for assisting in access to the data displayed on the display or for selecting data, changing the display and/or actuating a telephone function based on the status of the display. Network devices are also connected to the network telephone system and include a web browser software interface supported by (interfacing with) the network call processor and central database and resident on the network device for managing at least a portion of the central database. Particularly, the web browser is used to manage a user's data on the central database to add or remove names, data, telephone numbers and otherwise change the contents of the database. The user subsequently may access the data via the key of a network telephone and the display of the network telephone. By using the web browser to manage the information in the central database, the user establishes the content of the information that is accessed through the key(s) and display of the network telephone.

The fundamental idea of the invention is to provide a web browser based interface to set up and manage user information (e.g., frequently called names and phone numbers, voice data prompts for different voice mail situations, etc.). This managed data or information, such as a list of numbers, is displayable and accessible via the display (e.g. a liquid crystal display—LCD) on the user's network telephone. The combination of features allows for a process including allowing the user to use the web browser interface to add and remove names/numbers from the list. The user presses a button on the phone that will display several lines of the personal directory (the number of lines based on the number that can be displayed on the LCD). Other buttons on the phone will allow the user to navigate (via scrolling or jumping) to a particular name on the list (e.g., keys associated with the display regions—soft keys—or number keys with letters, to jump among letters in the list). Another button allows the user to dial a selected number or highlighted number.

The personal directory information is stored in user specific records in the central database on the call processing server. This personal information is made available in addition to the company-wide information that the control processor server also has in the central database.

A further aspect of the invention is to provide a network telephone method or process including providing a network with a network control processor server, data storage and connected network telephones. Preferably a line card interface is also provided, linking the telephone network to the public telephone network. The process includes establishing a network telephone user database using the data storage. A network software interface is established on the network device (preferably on any connected network device wherein such is desirable) with a graphical user interface, which interface is supported by the central call processor server and can acces the central database. The data is then accessed by the user through the software interface for changing the user data or updating such data. The user then can access selected portions of the changed user data at the display of the network telephone device by use of one or more keys at the telephone device. The function of at least some of the keys is set by the content of the display. Specifically, soft keys or regions of the display change and the function of the keys near to the display or associated with a portion of the display change along with the change in the display.

The web based interface can be used to browse the list, select an entry and dial that number via the web browser mechanism (particularly using the telephone application program interface—TAPI).

The described preferred embodiment includes the network as a distributed network, namely Ethernet (CSMA/CD/IEEE802.3) with telephone units and/or computer units provided as network devices connected together via a hub/router or switch and with a server or similar device connected to the network as well. A line interface unit provides a line card connecting an outside line to the network. The line interface sends packets through the network corresponding to data received at the outside or public telephone line. The network call processor is connected to the network for controlling communications between the telephone network devices.

The network call processor may be provided as a stand alone unit with a chassis and a hard drive. The memory may be provided in a different format as well (RAM etc.). The network call processor may also be a card provided in a network telephone system chassis, the same chassis or box as the line interface with line card. In the alternative, the network call processor may be a card which is connected to the server. In such a situation, the network call processor may have its own hard drive or may use the hard drive of the associated server.

The preferred embodiment further provides network telephones with a further Ethernet type connection for connecting a computer via the telephone. As described further herein, the arrangement establishes two collision domains, one on the telephone network side of the telephone and another collision domain on the other side of the telephone. The network telephone device forwards packets directed to the computer and processes packets directed to the telephone device. Other telephone network arrangements can also be provided.

The invention can also be practiced with other types of networks including networks using a wireless connection (IR, radio frequencies etc.) as some part of the link or interconnection of networking devices. Further, the system can be used without a line card connecting to public lines. In this case, the numbers of other users of the network are monitored. The network can include LANs as well as wide area networks (WANs) and the Internet.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, the invention comprises a network telephone system generally designated 1. The system includes a network call processor (NCP) 4. The NCP 4 is a network control processor that monitors the network system 1.

The telephone system 1 is provided as part of a digital distributed network (e.g., a LAN) Ethernet network 18. The network comprises network media (such as twisted pair of various types and categories, cable, infrared, wireless etc.). The preferred embodiment includes twisted pair wiring connected via a hub/router or switch. The network 1 may be established using network software (NOVELL, WINDOWS NT, etc.) run on a server 47 for communication between computers 42 and other network devices 20, 44 and 46.

Figure 1:
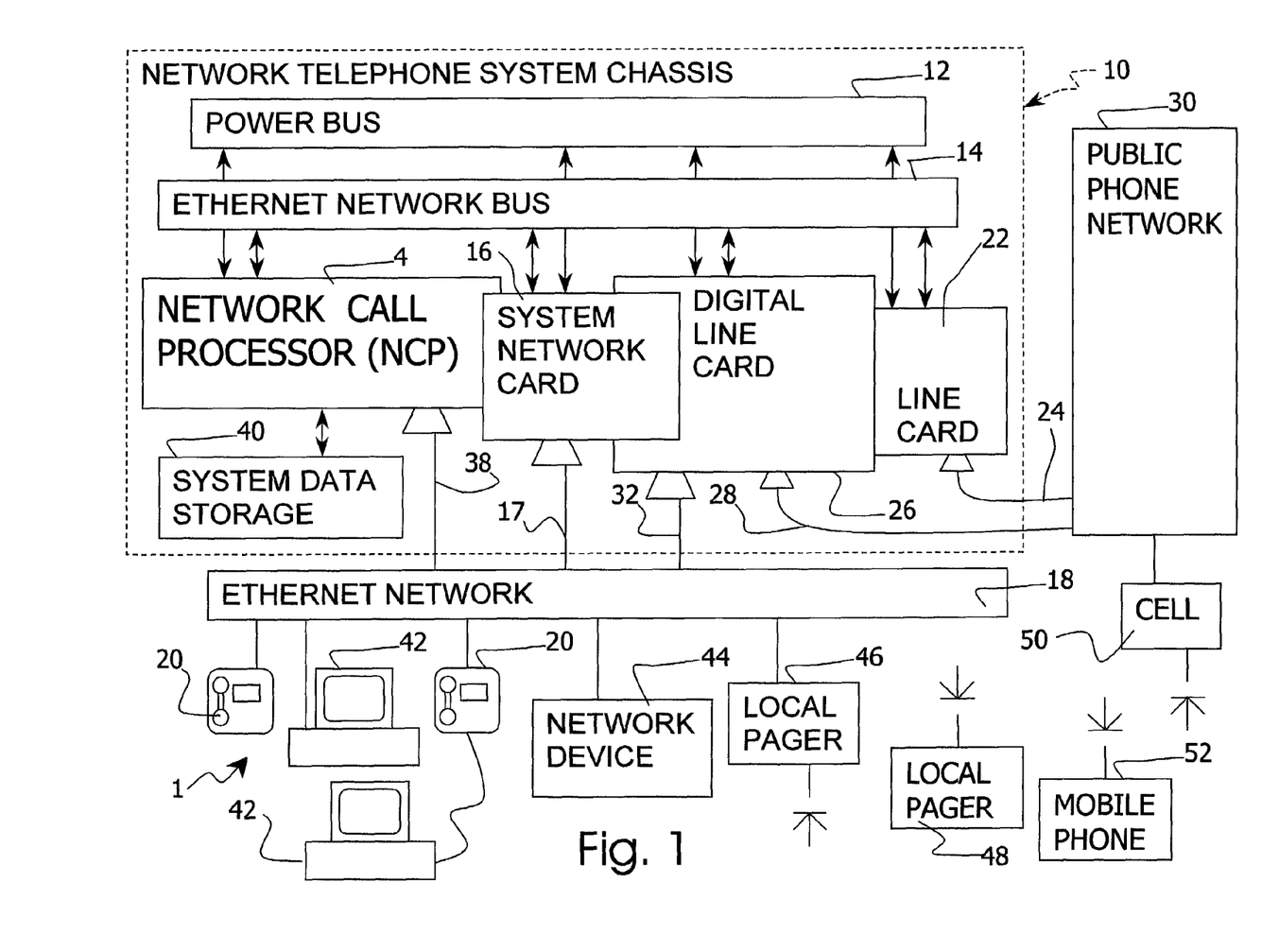
FIG. 1 is a system diagram showing system features according to the invention.

A preferred embodiment of the invention provides a network telephone system with network telephone devices 20 (e.g. many telephones 20 for many users at a facility). In the embodiment shown the NCP 4 is provided in a network telephone system chassis 10 that provides power through power bus 12 and provides a network connection through the Ethernet network bus 14. The NCP 4 is connected to the Ethernet network bus 14 and the power bus 12. The system network card 16 provides a connection 17 from the NCP 4 to the Ethernet network 18. The network telephones 20 are connected to the Ethernet network 18 as network devices. A line card 22 is also connected to the power bus 12 and Ethernet bus 14. The line card 22 is connected to a public switched telephone network (PSTN or other data network) 30 as shown at 24. Other line cards such as a digital line card 26 may also be provided (e.g., a Ti line). The digital line card 26 is also connected to the public phone network or other data network 30 as shown at 28. The digital line card 26 is connected to bus 14 and may also be directly connected to the Ethernet network 18 as shown at 32. The NCP 4 may also be connected directly to the Ethernet network as shown at 38.

The particular arrangement shown is not critical to the system of the invention. Any of the units shown in the network telephone system chassis 10 may be provided separately or in combination with other network devices. In the embodiment shown in FIG. 1 system data storage 40 is provided connected to the NCP 4. The system data storage 40 can also be provided separately, for example in a network server 47 (see FIG. 2) or in combination with other network devices. The NCP 4 may be connected to multiple data storage facilities. The NCP 4 may be a stand alone unit or it may be in the same chassis as cards 16, 26 and 22, or NCP 4 may be provided with the server 47.

Various network devices can be connected to the Ethernet network 18. These include the network telephones 20, computers 42 and other network devices designated 44. A network device in the form of a local pager 46 may be connected to the Ethernet network 18 to send a radio frequency signal to a local pager device 48. The public telephone network 30 is connected to a cellular network 50 which communicates with mobile phones such as mobile phone 52, other phones connected to the public network and other services (e.g., wide area paging). Although specific examples are given, various connections may be made to local area networks and to wide area networks.

Figure 2:
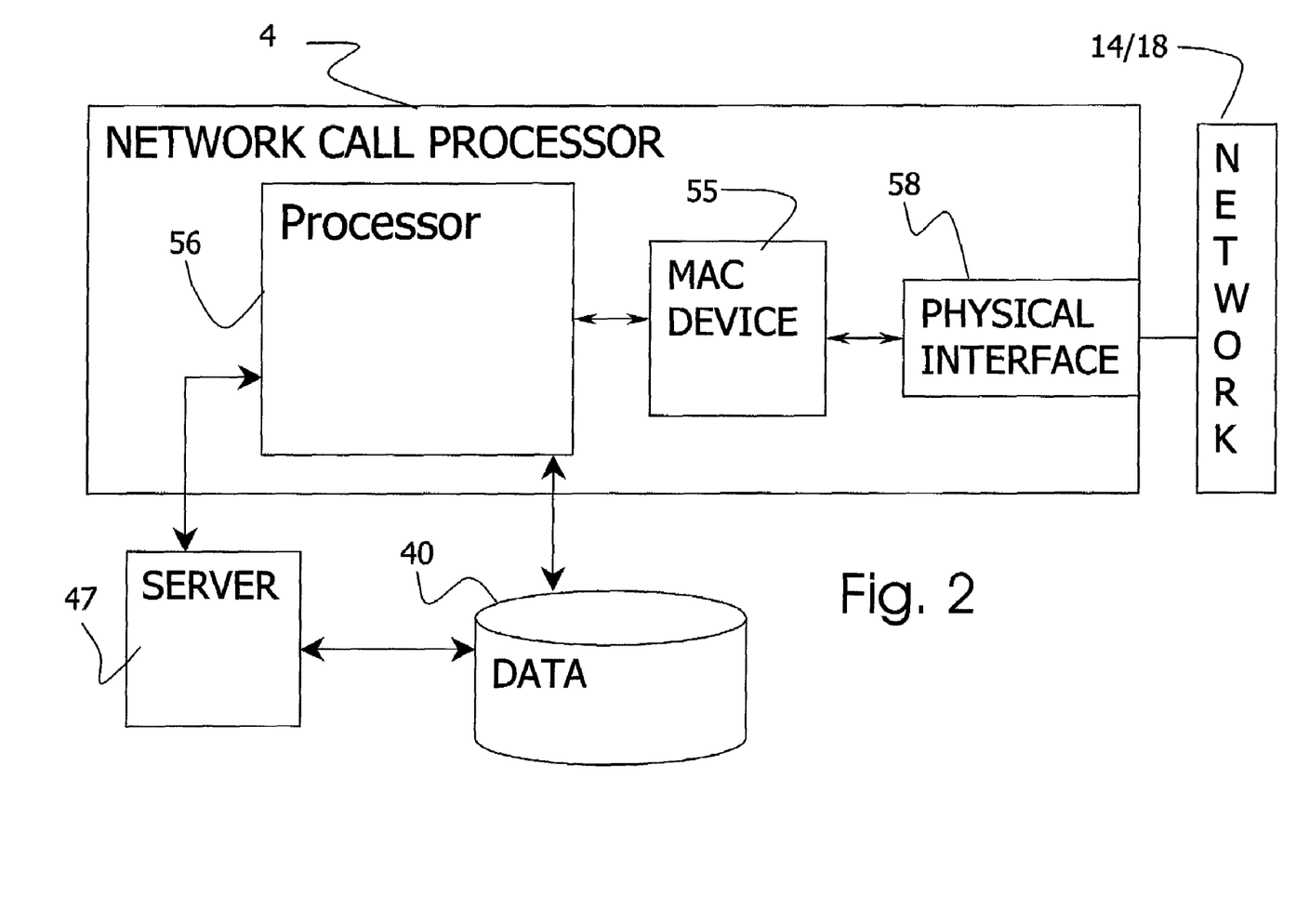
FIG. 2 is a diagram showing features of the network processor, particularly a telephone network call processor.

As shown in FIG. 2, the NCP 4 includes a processor 56 which is connected to system data storage 40. The processor 56 monitors telephone network traffic and other network features. The processor cooperates to establish conference calls and establishes system user data. The processor 56 may also monitor other network functions or may receive packets from other network control devices relating to network functions such as status, errors, faults etc.

The NCP 4 may have a direct connection 38 to the Ethernet network 18 via MAC device 62 and physical interface 64, as shown in FIG. 2. As an alternative to the embodiment shown in FIG. 1, the NCP 4 may be directly connected to a server 47 which itself is connected to the Ethernet network 18. The data storage 40 may be connected to the server.

Figure 3:
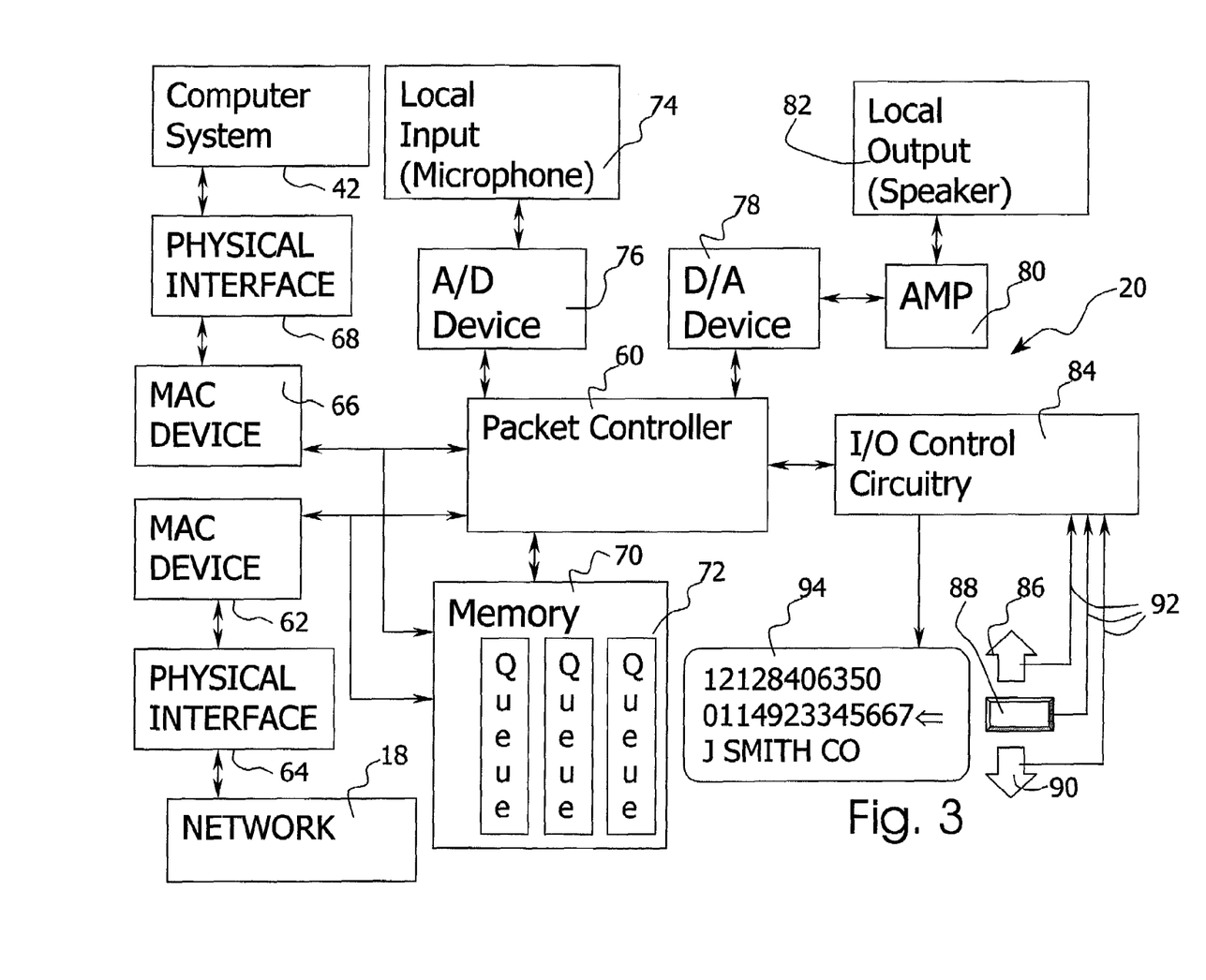
FIG. 3 is a diagram showing features of a network telephone device according to the invention.

FIG. 3 shows features of a network telephone unit 20. The network telephone 20 includes a packet controller 60 for receiving packets, sending packets and forwarding packets received from the network 1 to an associated network device 42, when the packet is addressed to the associated device 42. The device 20 may be used such that two different collision domains (using CSMA/CD) are established, one at the side of the computer system 42 and one at the network 1 (this is explained in application Ser. Nos. 09/204,102; 09//203,542; and 09/204,107, which are hereby incorporated by reference). The network telephones may be provided as described in U.S. Application Ser. No. 09/204,102; and/or U.S. application Ser. No. 09//203,542; and/or U.S. application Ser. No. 09//204,107.

According to a preferred embodiment of the invention, the network telephone 20 includes a base unit with handset. Basic function keys (numbers etc.) may be provided. The network telephone 20 has a connection to the Ethernet type network 18 discussed above. Each unit 20 has at least a MAC device 62 connecting the unit via a physical interface 64 to the network 18. Preferably another MAC device 66 is provided connecting the unit via physical interface 68 to an associated network device 42, such as a network interface card of a computer system. Packets are sent and received over the network 18 and packets are sent and forwarded to the computer system 42 via the packet controller 60 from the network 18 or packets are forwarded from the computer system 42 via the packet controller 60 to the network 18. A memory 70 is provided whereby packets can be queued as shown at 72 for play out, for mixing or some other memory functions can be provided. A local input 74 in the form of a microphone is provided in the handset with an analog to digital converter device 76 providing the local input to the packet controller 60. At the output side a digital to analog converter device 78 converts packets to audio signals which are amplified at amplifier 80 and produced at local output (speaker) 82. The network telephone 20 includes input/output control circuitry 84 for controlling a display 94 as well as for receiving input signals from keys such as keys 86, 88 and 90 via connection circuitry 92. A display 94 is preferably a liquid crystal display (LCD). The packet controller 60 may include a timer, a digital signal processor (DSP), a processor (e.g., an ARM processor), a direct memory access (DMA) controller, control circuitry, an address table, and a memory controller coupled to each other by a signal bus. The DSP is in electrical communication with the A/D device 78 via a signal path and in electrical communication with D/A device 78 via a signal path. The memory controller is in electrical communication with the memory 70 by signal lines. The DMA controller is in electrical communication with the MAC devices 62, 66 by signal lines. The address table stores addresses that are of importance to the network telephone 20. Examples of such addresses include the address of the other network telephones 20, an identifier for a conference call, and a general broadcast address.

Figure 4:
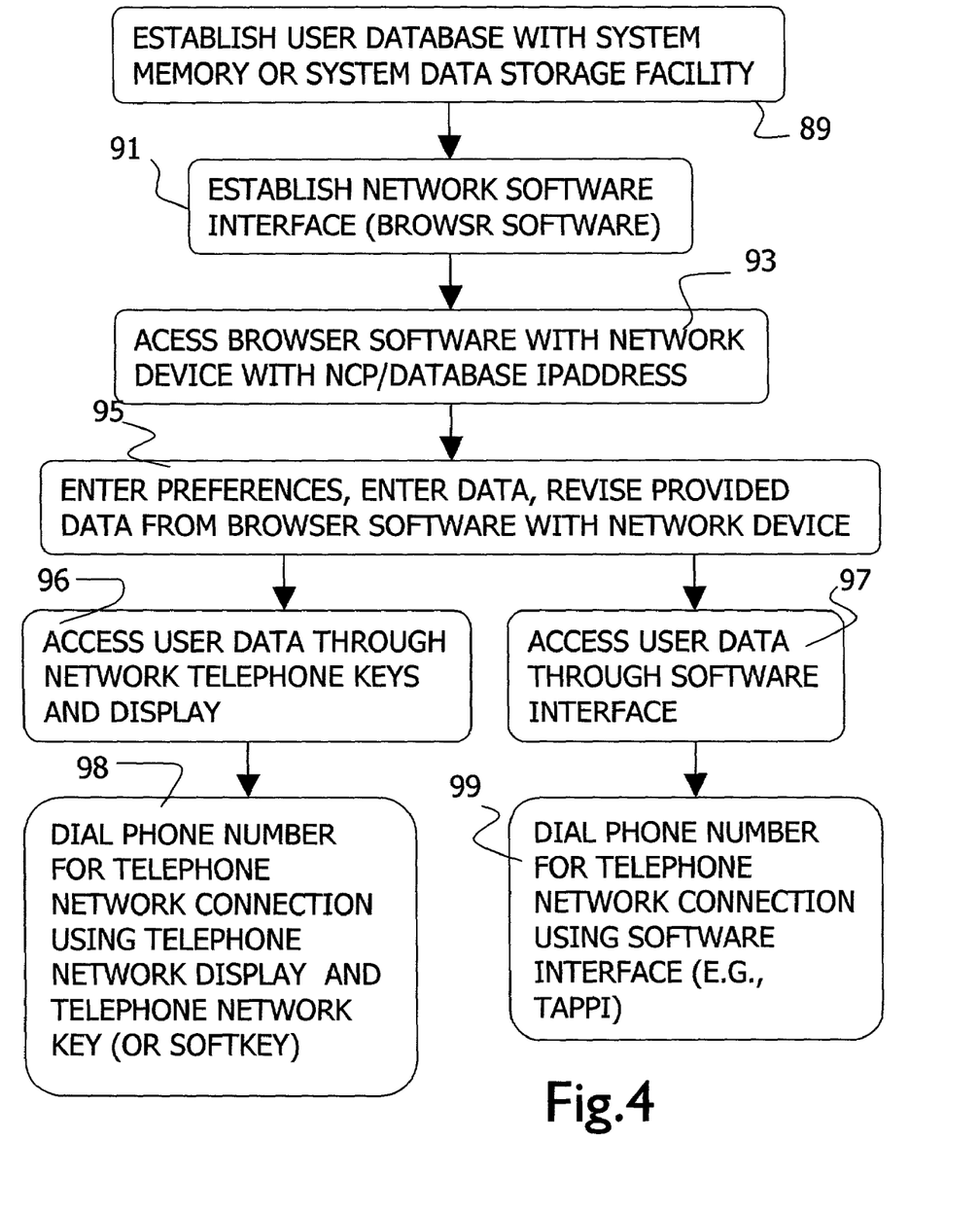
FIG. 4 is a flow diagram describing features according to the process of the invention.

In operation, a network is established with a processor 4 monitoring some network system attributes and receiving signals from other network devices. Calls are initiated by users at the user telephone network devices 20 under the control of the NCP 4. The NCP 4 establishes a user database with system memory or system data storage facility 40 as indicated at 89 in FIG. 4. The data can include system user preferences such as the allocation of actuation key functions on the user's network telephone unit 20. The database may include other preferences such as ring tones, speaker phone use, message preferences and other features. The data particularly includes names, addresses and associated telephone numbers. As indicated at 91 in FIG. 4 the NCP 4 the web browser software interface 100 (e.g., NETSCAPE or MICROSOFT EXPLORER) is established on at least one network device 42 as shown at 91 in FIG. 4. The browser software 100 provides access with the network device 42 by entering the NCP/database location in the browser location window or "go to" window 110, as shown at step 93 in FIG. 4. This address is established with respect to the NCP 4 and the data storage. The browser 100 then accesses the web pages (e.g. HTML pages) set up on the system (saved in the central database on storage 40). Some of the content is provided with the system while other data entered into the system after installation. Upon accessing the web pages, the user can then enter preferences, enter data, revise data which is provided and revise old data as shown at 95. This allows the user to add names, telephone numbers, addresses and other information.

Figure 5:
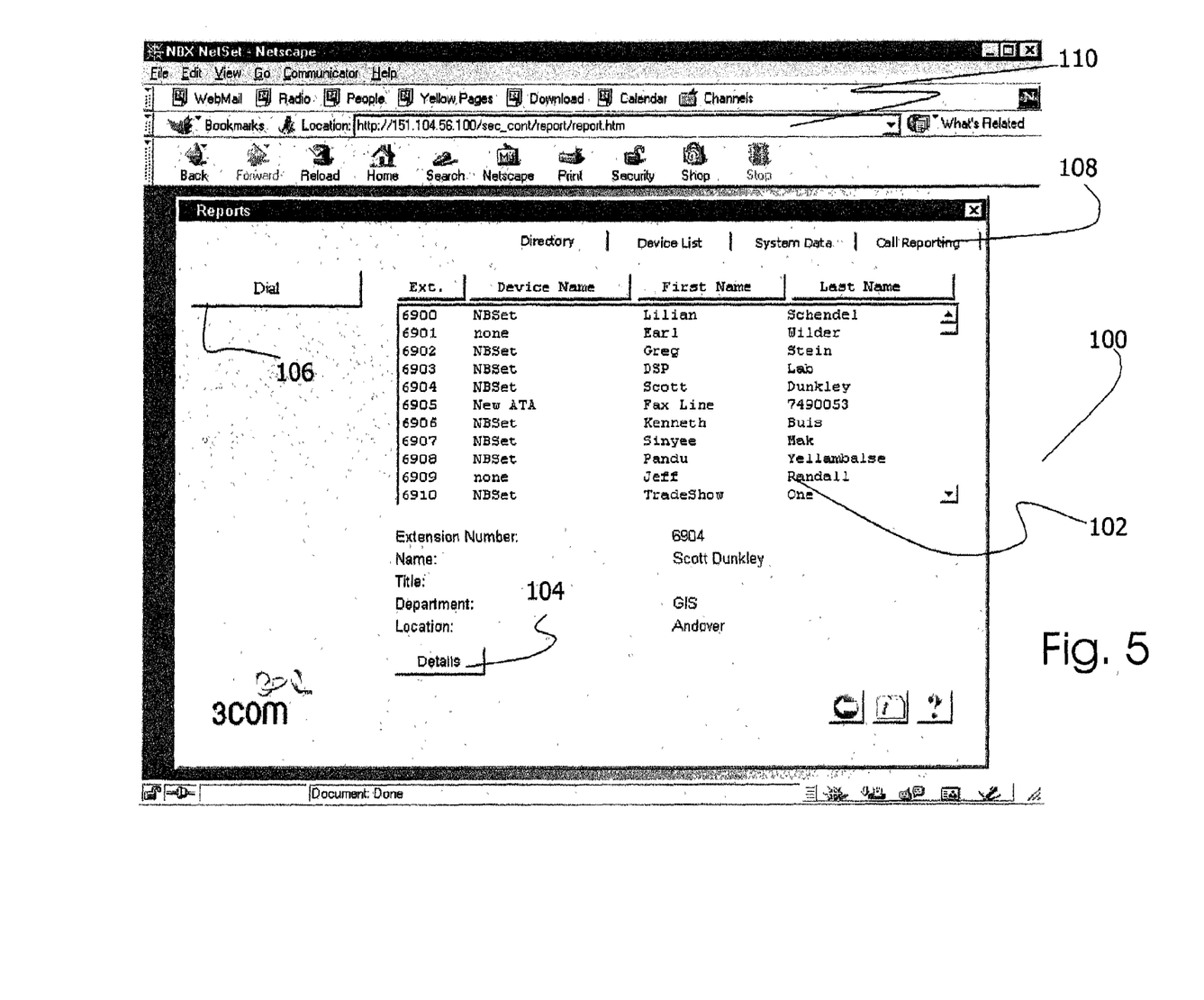
FIG. 5 is a view showing an example of a web browser software interface used at a network device.
Figure 6:
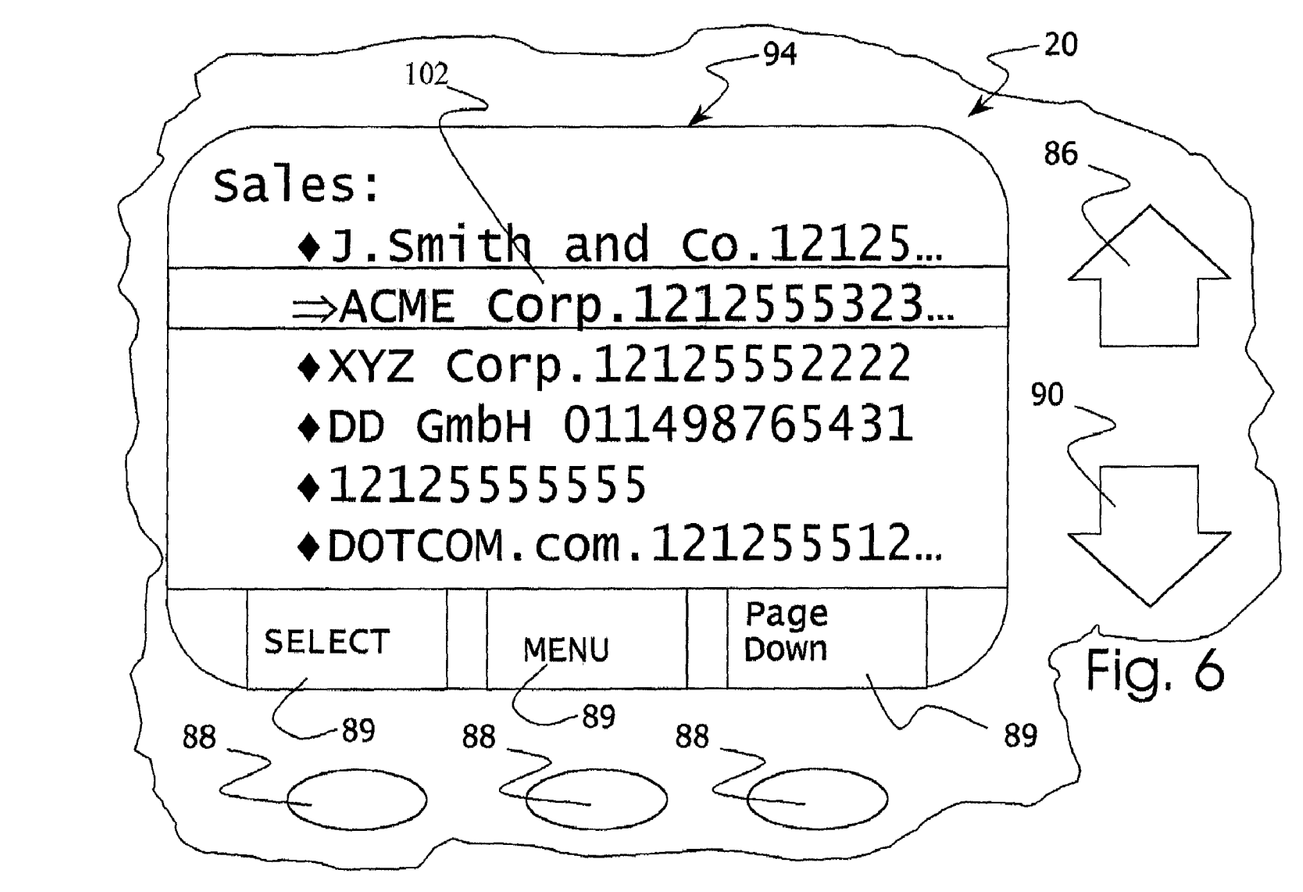
FIG. 6 is a cutaway top view showing a display with softkey display regions for keys of a network telephone.

FIG. 5 shows an example with the display data 102 being associated with internal numbers to the system (extensions). Other groupings of numbers can be provided. FIG. 6 shows display data 102 for a different category or group. The user can establish categories or the user can provide all of the names/numbers in one list. Internal numbers (extensions) and external public system telephone numbers can be provided. At step 96, the user can access the data through the network telephone keys and display. The display 94 is shown in FIG. 6 with the display data 102 shown. The keys 88 are provided allowing the user to take some action with the data (dial the number), scroll or page through the data, etc. Soft key display regions 89 can be used to indicate the present function of the keys 88. Additionally the data items 102 may be highlighted or an indicator may be displayed to show that the data item is selected to and ready to be slected or actuated with a key 88. The selection may be done by using scroll up and down keys 86 and 90. In the example shown, the second item is selected. By pressing the left most button 88 (assigned the select function 89 as shown by the left most soft key) the telephone number for the second data entry 102 is dialed. This is it indicated at step 98 FIG. 4.

The units 20 function like an ordinary PBX type telephone. A telephone call from the outside telephone line is either sent directly to the unit 20 or it is sent to the unit 20 via another network device acting as an operator (this is either with human intervention or an automatic system). The NCP 4 monitors and controls voice packets and sends control packets to the network telephone units 20. When the user takes the handset into an off hook condition, the packet controller 22 begins receiving voice packets which are queued in a queue 72 and are sent to the speaker 82 after digital signal processing, at the DSP, if necessary. The signal is converted at D/A converter device 78, it is amplified at the amp 80 before being output at the speaker 82. The device 20 also provides the ability to engage in a conference call and receive a page or further input from another device connected to the local telephone network 10.

As shown in FIG. 5 the user data 102 may also be accessed through the web browser 100. The step is indicated at 97 in FIG. 4. The user may change the data as indicated above and may also view the details of the data by pressing soft key 104. Some of the data can be established by an administrator or it may be shiped with the product. Further, the NCP can monitor incoming and outgoing calls to build a user database of numbers. This can be accessed by clicking soft key 108. The user can dial a selected data entry 102 by clicking the dial soft key 106. By establishing the appropriate TAPI driver on the network device 42, clicking on soft key 106 results in the user's network telephone 20 dialing the number. The step is indicated at 99 in FIG. 4.

The NCP 4 maintains state information for all devices (network telephones and interface devices cards connected to PC's attached to the network) in the telephone network. When a call is made from a network telephone 20, each digit that is pressed is sent to the NCP. The NCP collects the digits and, using an internal dial plan, determines how to route the call (internal call, external call, etc.). In addition, the NCP 4 may be used to record the dialed number and store it in a database in storage 96 where it can be accessed later via the phone's LCD 94 or via the Web Based interface 100.

While specific embodiments of the invention have been shown and described in detail to illustrate the application of the principles of the invention, it will be understood that the invention may be embodied otherwise without departing from such principles.

What is claimed is:

1. A network telephone system comprising:
    a distributed network;
    a network call processor with data storage forming a central database, said call processor being connected to said distributed network;
    a plurality of network telephones, each network telephone being connected to said distributed network, user specific records provided at said central database and web pages formed from data at said database, each telephone having a display for displaying information stored in said central database including user specific records and having at least one key;
    a network device connected to said distributed network;
    a web browser software interface supported by said network device for accessing said web pages and data and for managing said central database to add and remove names and telephone numbers to said database, said key of said network telephones actuating said user specific records for display of at least a part of said user specific records on said telephone display;
    a telephone line to distributed network interface connected to a telephone line and connected to said distributed network for receiving packets from said distributed network and sending packets to said distributed network including packets with telephone voice data, said network call processor controlling packets from said telephone line to distributed network interface to said network telephones, said web browser further including means for actuating one of said plurality of network telephones as a user's autuated network telephone via input at said network device using said network device and making a call using one of the telephone numbers, said call including voice packets being sent to the user's actuated network telephone.

2. A network telephone system according to claim 1, wherein said database includes system telephone data and said user specific data and said web browser software interface provides users with a personal user directory.

3. A telephone network system according to claim 2, wherein said personal user directory includes a name directory of users of the system including user access numbers whereby each user can access each of a company name directory and a personal name directory via said web browser and keys of the user's network telephone.

4. A telephone network system according to claim 1, wherein said web browser software interface includes features for customizing the display of user data at said network telephone display.

5. A telephone system according to claim 1, wherein said means for actuating one of said plurality of network telephones for making a call using one of the telephone numbers includes means for displaying said one of said numbers at said network device and an interface for initiating actuation based on the displayed number, sending packets to said telephone line network interface for initiating the call and sending packets with telephone voice data back and forth between the user's actuated network telephone and said telephone line to distributed network interface, either directly or via said network call processor.

6. A network telephone according to claim 1, wherein said network telephone key is associated with said display for one or both of accessing the numbers for display on the display, for selecting a number and for calling the selected number on the user network telephone.

7. A network telephone according to claim 6, wherein said network telephone key provides a function that changes based on the content of the display.

8. A network telephone system according to claim 1, wherein said network call processor is connected to a server connected to said distributed network and said data storage is a server hard disc drive.

9. A network telephone system according to claim 1, wherein at least one of said network telephones includes a packet controller and input/output circuitry for receiving packets including data corresponding to said data from said central database and for controlling said display for selectively displaying information corresponding to said data.

10. A network telephone system according to claim 1, wherein said network device is a computer connected to said distributed network.

11. A network telephone system according to claim 10, wherein said network device is connected to an associated one of said plurality of network telephones, said one of said plurality of telephones being connected to said distributed network with two network collision domains being established including a collision domain with said at least one network telephone and said network device and a collision domain with said at least one network telephone and other connected ones of said plurality of network telephones and/or other network devices, at least one of said plurality of network telephones receiving packets from said distributed network and forwarding packets to said network device, which are addressed to said network device.

12. A network telephone system according to claim 1, wherein at least some of said plurality of network telephones include a packet controller receiving packets corresponding to multiple sources and combining packets for producing a conference call.

13. A network telephone method, comprising the steps of:

providing a network with a network call processor, data storage and connected network telephones and a network device connected to the network;

establishing a network software interface with a graphical user interface on the network device;

establishing a network telephone user database using the data storage;

accessing said data through said software interface for changing user data;

displaying selected portions of the changed user data at the display of the network telephone device by use of one or more keys at the network telephone device, the function of the keys being set by the content of the display;

initiating telephone calls by generating packets based on input commands into said graphical user interface addressed to said network call processor with said network call processor sending packets in response wherein packets sent to said network call processor include packets for initiating a phone call at one of the network telephones, whereby said network call processor sends packets to said one of the network telephones for initiating a call;

initiating telephone calls by actuating one or more keys at the user's network telephone device to send packets to said network call processor for initiating a call based on the content of said display.

14. A network telephone system comprising:

a distributed network;

a network call processor with data storage forming a central database, said call processor being connected to said distributed network;

a plurality of network telephones, each network telephone being connected to said distributed network and having user specific records at said central database and web pages formed of data from said central database, each telephone having a display for displaying information stored in said central database including user specific records and having at least one key;

a network computer device connected to said distributed network via an associated one of said plurality of network telephones, said one of said plurality of telephones being connected to said distributed network to establish two network collision domains including a first collision domain with said at least one network telephone and said network device sending and receiving packets in said first collision domain and with a second collision domain with said at least one network telephone and other connected network telephones and/or other network devices sending and receiving packets in said second collision domain, said at least one of said plurality of network telephones receiving packets from said distributed network and forwarding packets to said network device, which are addressed to said network device;

a web browser software interface supported by said network device for accessing said web pages and data and for managing said central database to add and remove names and telephone numbers to said database, said key of said network telephones actuating said user display.

15. A network telephone system comprising:

a distributed network;

a network call processor with data storage forming a central database, said call processor being connected to said distributed network;

a plurality of network telephones, each network telephone being connected to said distributed network and having user specific records at said central database and having web pages, each telephone including a telephone display for displaying information stored in said central database including user specific records and having at least one key;

a network computer device connected to said distributed network via an associated one of said plurality of network telephones, said at least one of said plurality of network telephones receiving packets from said distributed network and forwarding packets to said network device, which are addressed to said network device;

a web browser software interface supported by said network device for accessing said web pages and data and for managing said central database to add and remove names and telephone numbers to said database, said key of said network telephones actuating said user specific records for display of at least a part of said user specific records on said telephone display, said software interface generating packets based on an input command to said network computer device with said command associated with a displayed database telephone number to initiate a telephone call at one of the network telephones, whereby said network call processor sends packets to said one of the network telephones.

16. A network telephone according to claim 15, wherein said network telephone key is associated with said telephone display for one or both of accessing the numbers for display on the telephone display, for selecting a number and for calling the selected number on the user network telephone.

17. A network telephone according to claim 16, wherein said network telephone key provides a function that changes based on the content of the display.

\* \* \* \* \*